(12) United States Patent
Kim

(10) Patent No.: US 9,129,162 B2
(45) Date of Patent: Sep. 8, 2015

(54) VEHICULAR PARKING CONTROL SYSTEM AND VEHICULAR PARKING CONTROL METHOD USING THE SAME

(71) Applicant: MANDO CORPORATION, Pyeongtaek-si, Gyeonggi-do (KR)

(72) Inventor: Sung Ju Kim, Seoul (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 145 days.

(21) Appl. No.: 13/902,645

(22) Filed: May 24, 2013

(65) Prior Publication Data

US 2013/0315443 A1 Nov. 28, 2013

(30) Foreign Application Priority Data

May 25, 2012 (KR) .................. 10-2012-0056016

(51) Int. Cl.
*G06K 9/00* (2006.01)
(52) U.S. Cl.
CPC ........ *G06K 9/00812* (2013.01); *G06K 9/00805* (2013.01)
(58) Field of Classification Search
None
See application file for complete search history.

(56) References Cited

U.S. PATENT DOCUMENTS

2009/0121899 A1* 5/2009 Kakinami et al. ......... 340/932.2
2009/0243889 A1* 10/2009 Suhr et al. .................. 340/932.2
2010/0283632 A1* 11/2010 Kawabata et al. ......... 340/932.2
2012/0069181 A1* 3/2012 Xue et al. ..................... 348/148
2012/0200708 A1* 8/2012 Fukuda ........................ 348/148

FOREIGN PATENT DOCUMENTS

| DE | 102008004633 | * | 1/2008 | ............ B60W 30/06 |
| DE | 10 2008 004633 A1 | | 7/2009 | |
| JP | 2003-034206 | * | 7/2001 | .............. B60R 21/00 |
| JP | 2003-034206 | * | 2/2003 | .............. B60R 21/00 |
| JP | 2006-315460 | * | 5/2005 | .............. B60R 21/00 |
| KR | 10-20130036431 | * | 10/2011 | ............ B60W 30/06 |

OTHER PUBLICATIONS

German Office Action issued in German Application No. 10 2013 008 451.2 dated Dec. 3, 2014, with English Translation.

* cited by examiner

*Primary Examiner* — Amara Abdi
(74) *Attorney, Agent, or Firm* — McDermott Will & Emery LLP (57) ABSTRACT

Provided are a vehicular parking control system capable of removing temporary obstacles from an image of objects within a parking space so that an available parking space can be searched for, and a vehicular parking control method using the same. The vehicular parking control system includes: a camera configured to acquire an image of a parking space with reference to a position of a personal car; a sensing unit configured to sense an object in the parking space; and an electronic control unit configured to search for an available parking space by comparing an image pattern of an object within the image of the parking space acquired from the camera with a preset reference image pattern, identifying the type of the object, and removing a contour of the object, the type of which has been identified as a temporary obstacle, from contours of objects in the parking space corresponding to a sensing signal sensed by the sensing unit.

7 Claims, 7 Drawing Sheets

Fig. 1

-- Prior Art --

Fig. 2

-- Prior Art --

VEHICULAR PARKING CONTROL SYSTEM AND VEHICULAR PARKING CONTROL METHOD USING THE SAME

CROSS-REFERENCE(S) TO RELATED APPLICATION

This application claims priority of Korean Patent Application No. 10-2012-56016, filed on May 25, 2012, in the Korean Intellectual Property Office, the contents of which are incorporated herein by reference in its entirety.

BACKGROUND OF THE INVENTION

1. Field of the Invention

The present invention relates to a vehicular parking control system and a vehicular parking control method using the same, and more particularly, to a vehicular parking control system capable of removing temporary obstacles from an image of objects within a parking space so that an available parking space can be searched for, and a vehicular parking control method using the same.

2. Description of the Related Art

Recently, new types of vehicles (for example, automobiles), which have become daily necessities in modem days, are appearing on the market and running on streets in increasing amounts, causing various social problems such as traffic congestion and parking.

In particular, parking-related problems are serious because more vehicles appear in limited areas, cities, and nations, but parking spaces become smaller. In other words, insufficient parking spaces require a smaller designated parking zone in which one vehicle can be parked. As a result, more vehicles tend to be equipped with parking control systems, which can control parking of vehicles when drivers want to park them.

Such a trend is followed by an increasing demand for a vehicular parking control system, which can recognize a parking space more accurately when a vehicle is parked.

Figure 1:
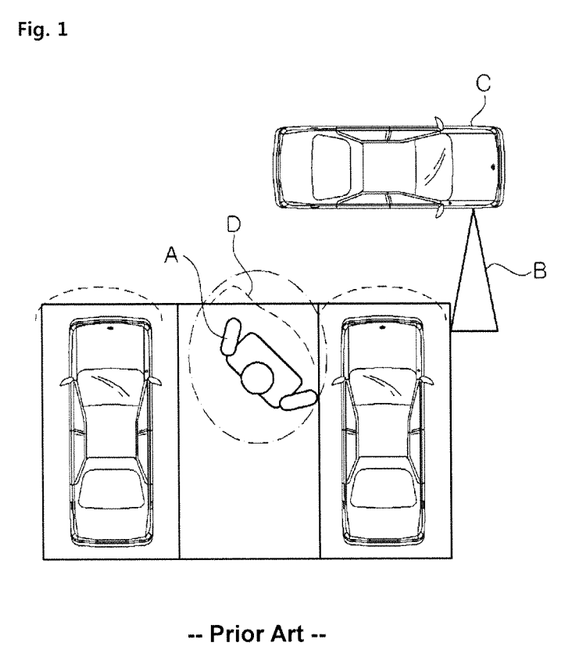
FIG. 1 is a diagram illustrating a failed search for an available parking space using a conventional vehicular parking control system.

In the case of an ultrasonic sensor used to recognize a parking space, there is a problem in that, when temporary obstacles, specifically a first object A (for example, passerby) and a second object B (for example, rubber cone), stand in-between with reference to the position of a personal car C, as illustrated in FIG. 1, it is impossible to acquire information regarding parking target objects positioned behind the temporary obstacles.

Furthermore, the temporary obstacles cause distortion in signals regarding the parking target objects, as indicated by D in FIG. 1, so that no available parking space is found. As such, there are limitations in recognizing an available parking space through ultrasonic sensors.

Figure 2:
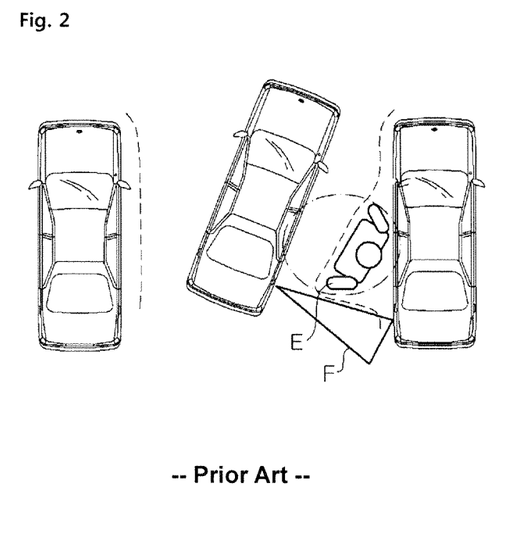
FIG. 2 is a diagram illustrating an erroneous final parking posture resulting from the use of the vehicular parking control system of FIG. 1.

In addition, as illustrated in FIG. 2, temporary obstacles E and F make it difficult to maintain a constant distance from a parking target in the final parking position, causing errors regarding the final parking position.

SUMMARY OF THE INVENTION

An aspect of the present invention is directed to a vehicular parking control system capable of removing temporary obstacles from an image of objects in a parking space so that an available parking space can be searched for, and a vehicular parking control method using the same.

According to an embodiment of the present invention, a vehicular parking control system includes: a camera configured to acquire an image of a parking space with reference to a position of a personal car; a sensing unit configured to sense an object in the parking space; and an electronic control unit configured to search for an available parking space by comparing an image pattern of an object within the image of the parking space acquired from the camera with a preset reference image pattern, identifying a type of the object, and removing a contour of the object, the type of which has been identified as a temporary obstacle, from contours of objects in the parking space corresponding to a sensing signal sensed by the sensing unit.

The temporary obstacle may be a non-fixed object, other than an automobile, which is temporarily positioned in the parking space.

The electronic control unit may include: a receiving unit configured to receive an image acquired from the camera and receive a sensing signal sensed from the sensing unit; an extracting unit configured to extract an image pattern of an object from the image received by the receiving unit; an identifying unit configured to compare the extracted image pattern with the reference image pattern and identify the type of the object, based on whether the extracted image pattern and the reference image pattern coincides with each other; a contour generating unit configured to generate a contour of an object corresponding to the sensing signal received by the receiving unit; and a correcting unit configured to correct contours of objects in the available parking space, when the identifying unit has identified the type of the object as a temporary obstacle, by removing a contour corresponding to the temporary obstacle from contours of objects generated by the contour generating unit.

The electronic control unit may be configured to output notification information notifying that the personal car has been parked correctly when the posture of the personal car parked in the searched available parking space is at a predetermined distance from an adjacent car and when the parked angle of the personal car is within a predetermined angle.

According to another embodiment of the present invention, a vehicular parking control method using a vehicular parking control system, which includes a camera configured to acquire an image of a parking space with reference to a position of a personal car and a sensing unit configured to sense an object in the parking space, the vehicular parking control method including: extracting an image pattern of an object from the image of the parking space acquired from the camera; identifying a type of the object by comparing the extracted image pattern of the object with a preset reference image pattern; and searching for an available parking space by removing a contour of the object, the type of which has been identified as a temporary obstacle, from contours of objects in the parking space corresponding to a sensing signal sensed by the sensing unit.

The searching step may include: generating a contour of an object corresponding to the sensing signal; and correcting contours of objects in the available parking space, when the type of the object has been identified as a temporary obstacle in the identifying step, by removing a contour corresponding to the temporary obstacle from contours of objects generated in the generating step.

The vehicular parking control method may further include, after the searching step, outputting notification information notifying that the personal car has been parked correctly when the posture of the personal car parked in the searched available parking space is at a predetermined distance from an adjacent car and when the parked angle of the personal car is within a predetermined angle.

DETAILED DESCRIPTION OF EXEMPLARY EMBODIMENTS

Exemplary embodiments of the present invention will be described below in detail with reference to the accompanying drawings.

Figure 3:
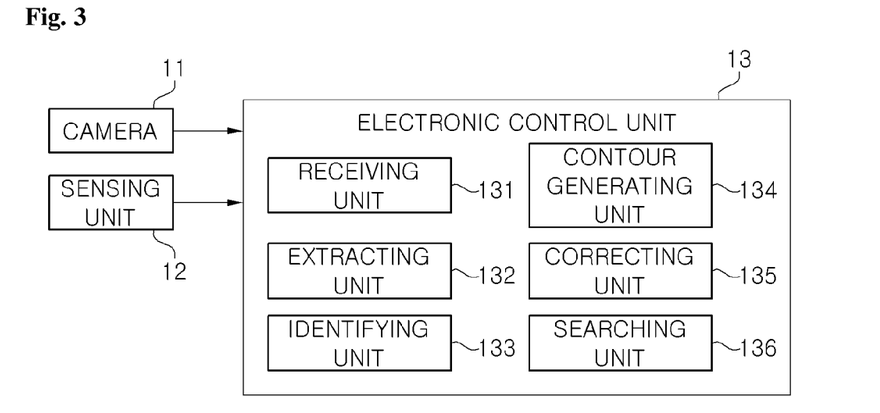
FIG. 3 is a block diagram illustrating a vehicular parking control system according to an embodiment of the present invention.

FIG. 3 is a block diagram illustrating a vehicular parking control system according to an embodiment of the present invention.

Referring to FIG. 3, the vehicular parking control system according to the embodiment of the present invention includes a camera 11, a sensing unit 12, and an electronic control unit 13.

The camera 11 may be an Around View Monitoring (AVM) camera which allows a driver to have a complete 360-degree view from the driver's seat. Furthermore, cameras 11 may be installed on the left and right sides, respectively, to acquire an image of a parking space positioned to the left or the right with reference to the position of the personal car.

Such a camera 11 is used to acquire an image of a parking space with reference to the position of the personal car, and the acquired image is provided to the electronic control unit 13. The camera 11 and the electronic control unit 13 are communicably connected to each other.

The electronic control unit 13 identifies the type of objects with regard to the image acquired by the camera 11 and distinguishes between parking target objects and temporary obstacles. As used herein, temporary obstacles refer to non-fixed objects positioned temporarily in the parking space other than automobiles, such as people and rubber cones.

The sensing unit 12 senses an object in an available parking space with reference to the position of the personal car. The sensing unit 12 may be an ultrasonic sensor (USS). A sensing signal sensed by the sensing unit 12 is provided to the electronic control unit 13. The sensing unit 12 and the electronic control unit 13 are communicably connected to each other.

The electronic control unit 13 generates contours of objects, which correspond to sensing signals sensed by the sensing unit 12, and removes contours, which coincide with temporary obstacles, from the generated contours so that contours of objects in the parking space are corrected, and an available parking space is searched for.

After the personal car has been parked in the searched available parking space, the electronic control unit 13 also calculates the distance between the personal car and the adjacent car. When the calculated distance is within a predetermined distance and when the angle of the parked personal car is within a predetermined angle, the electronic control unit 13 outputs notification information notifying that the personal car has finally been parked in the correct posture. The driver can easily recognize from the output notification information that the car has been parked correctly.

In order to calculate the distance between the personal car and the adjacent car, the electronic control unit 13 acquires images of the left and right sides with reference to the position of the parked personal car through the cameras 11, and extracts image patterns of objects from the acquired images. When an extracted image pattern does not coincide with a reference image pattern, the contour of an object corresponding to the extracted image pattern is removed. In this manner, the distance between the parking target object and the personal car can be calculated, and positional errors of the final parking posture can be eliminated.

The above-mentioned electronic control unit 13 includes a receiving unit 131, an extracting unit 132, an identifying unit 133, a contour generating unit 134, a correcting unit 135, and a searching unit 136.

The receiving unit 131 receives an image of a parking space acquired from the camera 11. The receiving unit 131 also receives a sensing signal of an object in a parking space sensed by the sensing unit 12. In the parking space, a parked vehicle, a person, a post, a rubber cone, and the like may be positioned.

The extracting unit 132 extracts an image pattern of an object from an image of a parking space received through the receiving unit 131.

The identifying unit 133 compares an image pattern of an object, which has been extracted by the extracting unit 132, with a pre-stored reference image pattern and determines whether both patterns coincide with each other. Specifically, the identifying unit 133 can identify the type of an object based on the fact that, among image patterns of objects, a parking target object coincides with the pre-stored reference image pattern, while a temporary obstacle (e.g. passer-by, rubber cone) does not coincide with the reference image pattern.

The contour generating unit 134 generates the contour of an object corresponding to a sensing signal received by the receiving unit 131. The contour of an object may be a dotted line illustrating the front portion of the object, not the entire shape of the object. Contours of objects generated in this manner may include both a parking target and a temporary obstacle.

The correcting unit 135 corrects contours of objects by removing contours of objects corresponding to image patterns, which have been identified as temporary obstacles by the identifying unit 133, from the contours generated by the contour generating unit 134. Therefore, even when a temporary obstacle is positioned before a parking target object, information regarding the parking target object, not the temporary obstacle, can be acquired. In addition, when a temporary obstacle is solely positioned without any parking target, an available parking space can be recognized.

After the correcting unit 135 corrects contours of objects, the searching unit 136 searches for an area, in which no contour exists, based on the corrected contours of objects as an available parking space.

After the personal car is parked in the searched available parking space in this manner, the electronic control unit 13 calculates the distance between the parked personal car and the adjacent car and determines whether the calculated distance is within a predetermined distance and whether the angle of the personal car is within a predetermined angle. When the distance is within the predetermined distance and when the angle of the personal car is within the predetermined angle, the electronic control unit 13 outputs notification information to a speaker and/or a display unit inside a terminal device installed within the vehicle to notify that the parking posture of the personal car is normal.

The predetermined distance refers to a range of distance between minimum and maximum values, for example, 30 cm and 70 cm. The predetermined angle may be, for example, 2 degrees. The angle of the personal angle is determined by the sensing unit 12 according to the change of posture of the parked personal car.

When the distance between the personal car and the adjacent car is calculated, the electronic control unit 13 extracts an image pattern of an object from images of the left and right sides, with reference to the position of the parked personal car, which are acquired through the cameras 11. When there is an image pattern of an object, which does not coincide with the reference image pattern, for example, when a temporary obstacle is positioned to the left or right with reference to the position of the parked personal car, the temporary obstacle is removed, and the distance from the parking target object, which is positioned to the left or right with reference to the position of the personal car, is then calculated. This eliminates errors of posture of the parked personal car resulting from the temporary obstacle, not the parking target object.

Although it has been assumed in the above description of the present embodiment that, when there is a temporary obstacle between the personal car and the adjacent car, the distance between the personal car and the adjacent car is calculated after removing the temporary obstacle, the present invention is not limited thereto, and it is also possible to directly calculate the distance between the personal car and the adjacent car without a separate process of removing a temporary obstacle because, when an available parking space is searched for, any temporary obstacle in the parking space is removed in advance.

Furthermore, the vehicular parking control system according to the embodiment of the present invention is configured as follows: when an image pattern of an object in an image acquired through the camera 11 corresponds to an image pattern indicating a temporary obstacle, the contour corresponding to the temporary obstacle is removed; when no image pattern of an object exists in the acquired image and when no parking line is extracted, the flag is maintained as '0' so that no available parking space is found. The flag can be set to indicate either a success or a failure to find an available parking space: for example, '1' indicates a successful search, and '0' indicates a failed search.

A vehicular parking control method using the vehicular parking control system, which has the configuration as described above, will now be described with reference to FIG. 4.

Figure 4:
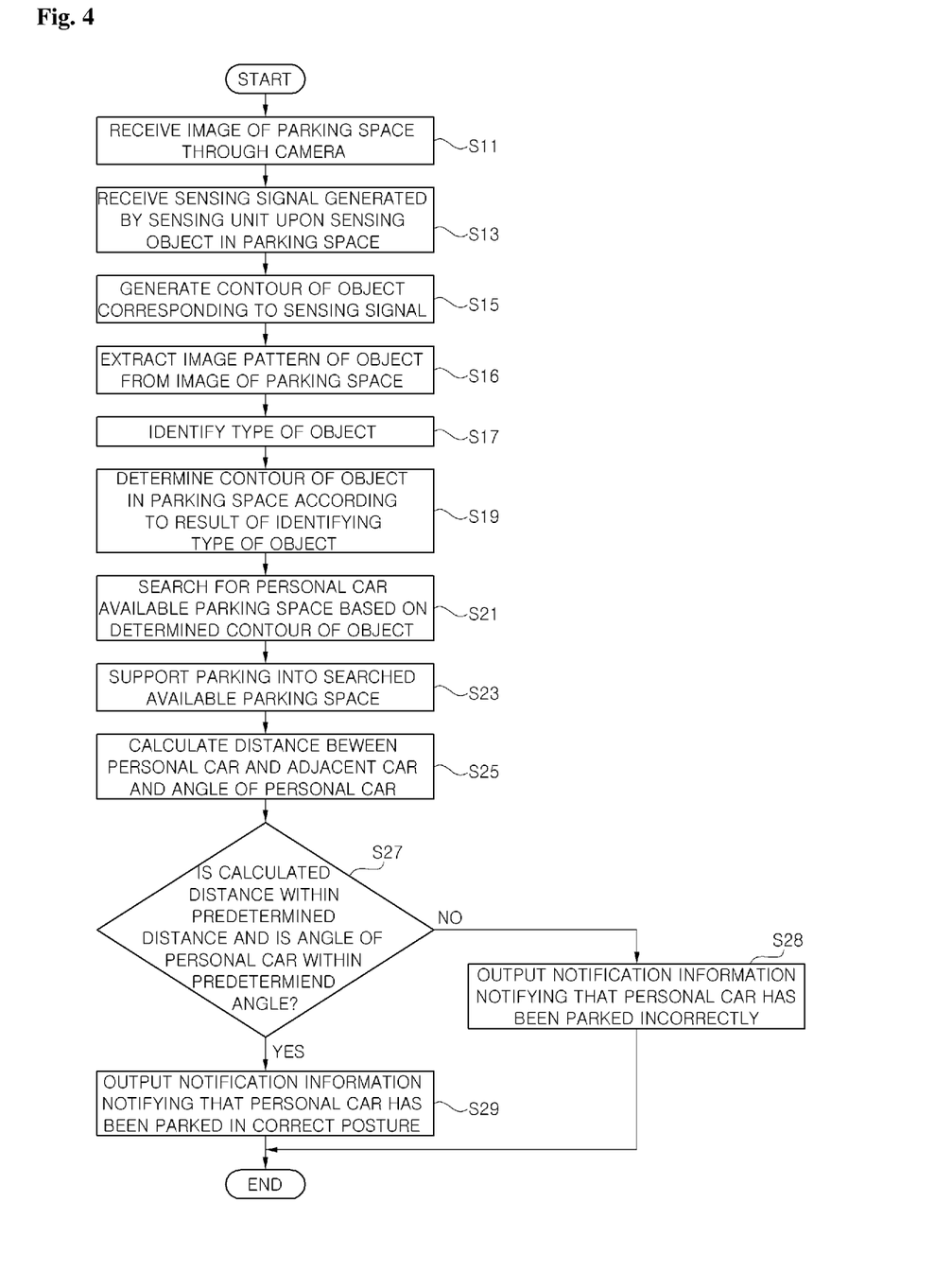
FIG. 4 is an operation flowchart illustrating a vehicular parking control method using the vehicular parking control system illustrated in FIG. 3.

FIG. 4 is an operation flowchart illustrating a vehicular parking control method using a vehicular parking control system according to an embodiment of the present invention.

Referring to FIG. 4, the electronic control unit 13 receives an image of a parking space acquired through the camera 11 (S11). The image of a parking space acquired through the camera 11 may be an image of a parking space positioned in front with reference to the position of the personal car, or an image of a parking space positioned to the left or right with reference to the position of the personal car. Step S11 can be implemented when an image of an available parking space is received before step S17 (described later).

Figure 5:
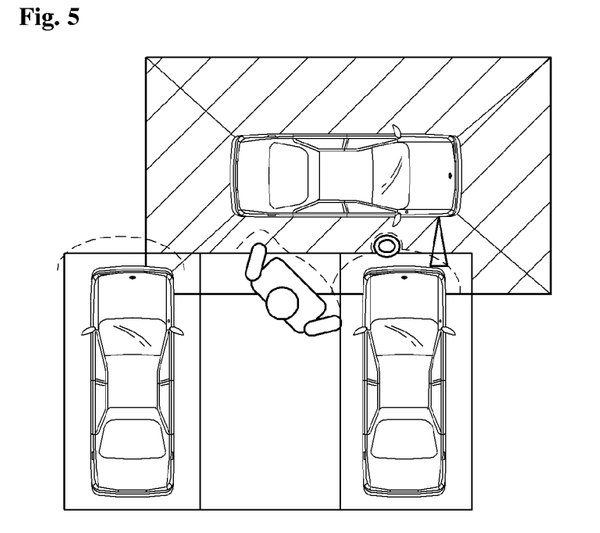
FIG. 5 is a diagram illustrating an image of objects in a parking space and contours of the objects, taken by the vehicular parking control system illustrated in FIG. 3.

As illustrated in FIG. 5, an image in a parking space positioned in front with reference to the position of the personal car is acquired through the camera 11. Although it is assumed in the description of the present embodiment that an image in a front parking space is acquired, it is also possible to acquire an image in a parking space positioned to the right with reference to the position of the personal car. The area of the image acquired through the camera 11 is indicated by underlines in FIG. 5.

The electronic control unit 13 receives a sensing signal generated by the sensing unit 12 as a result of sensing an object in an available parking space (S13). The received sensing signal is indicated by dotted lines in FIG. 5.

The electronic control unit 13 generates the contour of an object corresponding to the received sensing signal (S15). The generated contour of an object corresponds to the front side of a parking target facing the personal car, or the front of a temporary obstacle. As used herein, the temporary obstacle refers to a non-fixed object positioned temporarily in a parking space other than an automobile.

The electronic control unit 13 extracts an image pattern of an object from the received image of an available parking space (S16).

The electronic control unit 13 compares the extracted image pattern with a pre-stored reference image pattern and identifies the type of the object (S17). A plurality of image patterns of objects may exist in an image of an available parking space. Among the plurality of image patterns, there may be a pattern which coincide with the pre-stored reference image pattern, and a pattern which does not coincide with the pre-stored reference image pattern. In the case of an image pattern which coincides with the reference image pattern, the corresponding object may be a parking target; in the case of an image pattern which does not coincide with the reference image pattern, the corresponding object may be a temporary obstacle. Although the type of an object is identified according to whether the relevant image pattern coincides with the reference image pattern in the present embodiment, the method of identifying the object type is not limited thereto, and other methods can be variously adopted.

Figure 6:
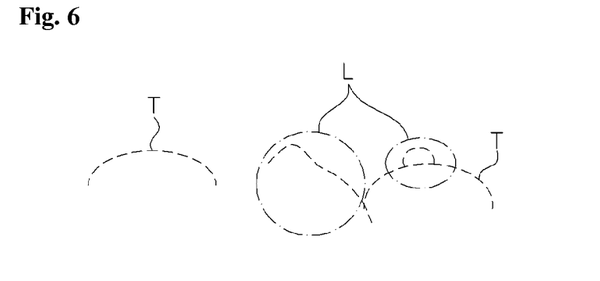
FIG. 6 is a diagram illustrating contours of all objects in an available parking space and contours of objects in a parking space after removing temporary obstacles.

The electronic control unit 13 removes only the contour of an object, which has been identified as a temporary obstacle in step S17, from contours of objects generated in step S15 and determines the contours of objects in the available parking space (S19). As illustrated in FIG. 6, contours of objects are corrected by removing contours L of temporary objects, excluding parking target objects T, from the generated contours of objects.

Figure 7:
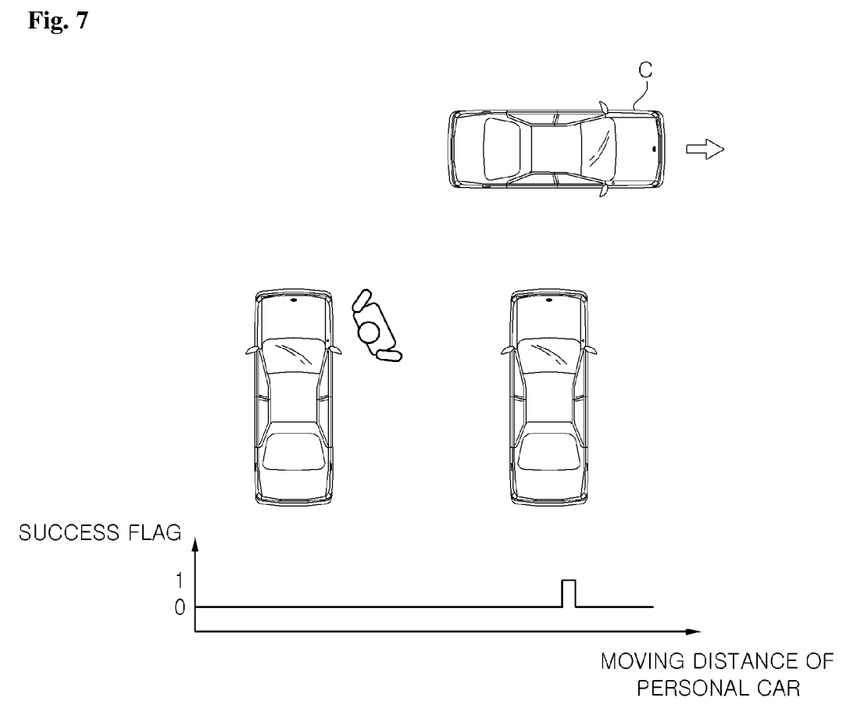
FIG. 7 is a diagram illustrating an example of successful search for an available parking space.

The electronic control unit 13 searches for a space available for parking of the personal car based on the determined contours of objects in available parking spaces (S21). Assuming that parking target objects are positioned at an interval between them with a person standing at a distance from them as illustrated in FIG. 7, the electronic control unit 13 removes temporary obstacles through the above-described process and finds an available parking space, and the flag concurrently changes from '0' to '1'. A flag value of '1' indicates that an available parking space has been found.

Figure 8:
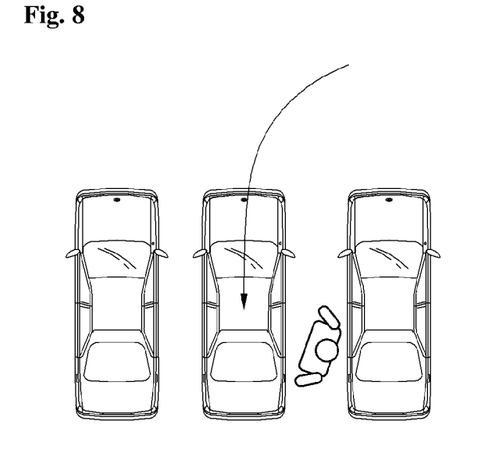
FIG. 8 is a diagram illustrating successful parking into a searched available parking space while maintaining a constant distance from a parking target even when there is a temporary obstacle during parking.

Then, the electronic control unit 13 supports parking of the personal car into the available parking space found (S23). It can be seen from FIG. 8 that, during parking into an available parking space, a temporary obstacle, if any, is removed, and parking is conducted while maintaining a distance from the parking target object behind the temporary obstacle.

After parking is completed, the electronic control unit 13 calculates the distance between the parked personal car and the adjacent car and the angle of the parked personal car (S25). The angle of the parked personal car can be calculated based on the change of posture of the personal car in the process of parking, and the distance between the parked personal car and the adjacent car, that is, the parking target object, can be calculated through a process of sending a sensing signal and receiving the returning signal by the sensing unit 12.

The electronic control unit 13 determines whether the calculated distance is within a predetermined distance and whether the angle of the parked personal car is within a predetermined angle (S27).

When it is determined in step S27 that the calculated distance is beyond the predetermined distance or the angle of the parked personal car is beyond the predetermined angle, the electronic control unit 13 outputs notification information notifying that the personal car has been parked incorrectly (S28).

When it is determined in step S27 that the calculated distance is within the predetermined distance and the angle of the personal car is within the predetermined angle, the electronic control unit 13 outputs notification information notifying that the personal car has been parked in the correct posture (S29). The notification information may be output through a speaker installed inside the vehicle or through a display unit within a terminal device installed inside the vehicle. It is also possible to output the notification information through both the speaker and the display unit.

Although it has been assumed in the description of the present embodiment that a parking target object and a temporary obstacle exist in a parking space, it is also possible, according to another embodiment, to implement in such a manner that, when a parking space has no parking target object but only a temporary obstacle existing therein, it is not regarded as an available parking space.

Figure 9:
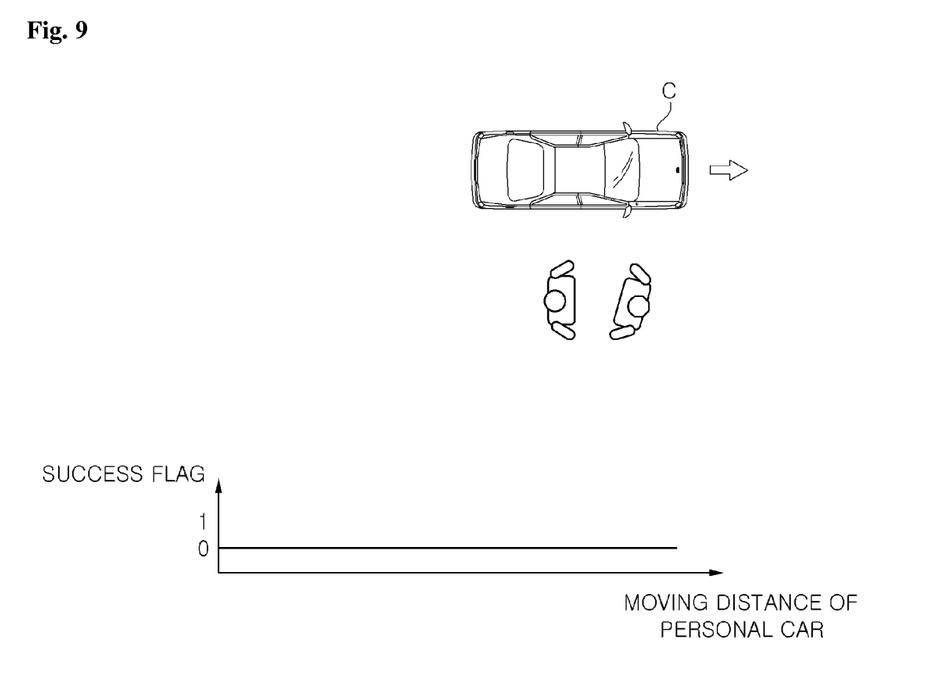
FIG. 9 is a diagram illustrating no available parking space found from a space which has no lane and in which no parking target object exists.

That is, as illustrated in FIG. 9, when the electronic control unit 13 acquires information regarding only temporary objects within the moving distance of the personal car, not the parking target object, the flag is maintained as '0' so that no available parking space is found.

More specifically, the electronic control unit 13 compares an image pattern of an object inside an image in a specific space acquired through the camera 11 with a pre-stored reference image pattern. In the case of a temporary obstacle, the contour corresponding to the temporary obstacle is removed. Then, if no image pattern of an object exists, and if no parking line is extracted from the image in the space, the flag, which indicates whether a search for an available parking space has succeeded or failed, is maintained as '0'.

This prevents a failure to find an available parking space due to a temporary obstacle existing in a parking space, the parking posture of the personal car is controlled so as not to influence a parking target positioned adjacent to the personal car, and a notification is provided after parking to notify that the car has been parked correctly. It is also possible to prevent a space other than a parking space, in which a temporary obstacle exists, from being erroneously found as an available parking space.

According to the embodiments of the present invention, there is an advantage in that temporary obstacles are removed from an image of objects in a parking space so that an available parking space can be searched for. Specifically, when a parking target object is positioned behind a temporary obstacle, information regarding the parking target object can be acquired by removing the temporary obstacle.

Moreover, according to the embodiments of the present invention, there is also an advantage in that notification information is output to notify that the personal car has been finally parked in the correct posture, thereby preventing errors regarding the final parking position.

While the embodiments of the present invention have been described with reference to the specific embodiments, it will be apparent to those skilled in the art that various changes and modifications may be made without departing from the spirit and scope of the invention as defined in the following claims.

| Reference Sings List | |
|---|---|
| 11: camera | 12: sensing unit |
| 13: electronic control unit | 131: receiving unit |
| 132: extracting unit | 133: identifying unit |
| 134: contour generating unit | 135: correcting unit |
| 136: searching unit | |

What is claimed is:

1. A vehicular parking control system, comprising: a camera configured to acquire an image of a parking space with reference to a position of a personal car; a sensing unit configured to sense an object in the parking space; and an electronic control unit configured to search for an available parking space by comparing an image pattern of an object within the image of the parking space acquired from the camera with a preset reference image pattern, identifying a type of the object, and removing a contour of the object, the type of which has been identified as a temporary obstacle, from contours of objects in the parking space corresponding to a sensing signal sensed by the sensing unit and searching for an area, in which no contour exist, as the available parking space.

2. The vehicular parking control system according to claim 1, wherein the temporary obstacle is a non-fixed object, other than an automobile, which is temporarily positioned in the parking space.

3. The vehicular parking control system according to claim 1, wherein the electronic control unit comprises: a receiving unit configured to receive an image acquired from the camera and receive a sensing signal sensed from the sensing unit; an extracting unit configured to extract an image pattern of an object from the image received by the receiving unit; an identifying unit configured to compare the extracted image pattern with the reference image pattern and identify the type of the object based on whether the extracted image pattern and the reference image pattern coincide with each other; a contour generating unit configured to generate a contour of an object corresponding to the sensing signal received by the receiving unit; and a correcting unit configured to correct contours of objects in the available parking space, when the identifying unit has identified the type of the object as a temporary obstacle, by removing a contour corresponding to the temporary obstacle from contours of objects generated by the contour generating unit.

4. The vehicular parking control system according to claim 1, wherein the electronic control unit is configured to output notification information notifying that the personal car has been parked correctly when the posture of the personal car parked in the searched available parking space is at a predetermined distance from an adjacent car and when the parked angle of the personal car is within a predetermined angle.

5. A vehicular parking control method using a vehicular parking control system, which includes a camera configured to acquire an image of a parking space with reference to a position of a personal car and a sensing unit configured to sense an object in the parking space, the vehicular parking control method comprising: extracting an image pattern of an object from the image of the parking space acquired from the camera; identifying a type of the object by comparing the extracted image pattern of the object with a preset reference image pattern; and searching for an available parking space by removing a contour of the object, the type of which has been identified as a temporary obstacle, from contours of objects in the parking space corresponding to a sensing signal sensed by the sensing unit;

wherein the available parking space is an area in which no contour exists.

6. The vehicular parking control method according to claim 5, wherein the searching step comprises: generating a contour of an object corresponding to the sensing signal; and correcting contours of objects in the available parking space, when the type of the object has been identified as a temporary obstacle in the identifying step, by removing a contour corresponding to the temporary obstacle from contours of objects generated in the generating step.

7. The vehicular parking control method according to claim 5, further comprising, after the searching step, outputting notification information notifying that the personal car has been parked correctly when the posture of the personal car parked in the searched available parking space is at a predetermined distance from an adjacent car and when the parked angle of the personal car is within a predetermined angle.

* * * * *